United States Patent

Johnson

[15] 3,641,655
[45] Feb. 15, 1972

[54] DEVICE FOR MOUNTING AND DEMOUNTING A BIT

[72] Inventor: Bernt Johnson, 644 S.E. 135th Avenue, Portland, Oreg. 97213

[22] Filed: June 25, 1970

[21] Appl. No.: 49,831

[52] U.S. Cl. ................................29/243, 29/427, 32/40 R
[51] Int. Cl. ..........................................A61c 3/00, B23p 19/02
[58] Field of Search...................29/243, 242, 247, 427, 278; 279/102, 103; 32/26, 40

[56] References Cited

UNITED STATES PATENTS

| | | | |
|---|---|---|---|
| 3,333,320 | 8/1967 | Black | 32/40 R |
| 3,394,449 | 7/1968 | Black | 29/427 X |

Primary Examiner—Andrew R. Juhasz
Assistant Examiner—Michael Koczo, Jr.
Attorney—Kolisch and Hartwell

[57] ABSTRACT

A device for mounting and demounting a bit in a friction chuck of a portable tool, which chuck includes a bit-receiving bore extending therethrough and opening to opposite sides of the tool. The device includes an elongated tube, open along one of its sides forming a channel which freely and slidably receives the tool for movement in the channel along a path paralleling the axis of the bore. A collar is mounted for sliding along the tube and for engaging a tool in the channel to move it toward opposite ends of the channel. An abutment is positioned at one end of the channel. On movement of the tool toward the abutment a bit interposed between the abutment and the tool is stopped by the abutment, and further movement of the tool forces the bit into the chuck. An elongated pin paralleling the channel axis extends into the channel from the opposite end of the tube and is aligned with the bore in the opposite side of the tool. On movement of the tool toward the pin end of the channel, the pin enters the bore and forces the bit out of the chuck.

6 Claims, 4 Drawing Figures

PATENTED FEB 15 1972 3,641,655

INVENTOR
BERNT JOHNSON
BY Kolisch & Hartwell
ATTORNEYS

DEVICE FOR MOUNTING AND DEMOUNTING A BIT

This invention relates to a device for mounting and demounting a bit in a chuck of a portable tool.

Portable tools, such as dental drills, or handpieces, often have friction chucks into which a bit may be inserted merely by forcing the bit into a close-fitting bore provided in such chuck. Referring specifically to a dental handpiece, such generally includes a head with a chuck bore extending fully therethrough and opening to opposite sides of the head, and a handle extending out from the head at a substantial angle to the bore. A bit generally is mounted in the chuck by being forced into one open end of the bore and is demounted by inserting a pin into the bore from its opposite end and forcing the bit out.

In some dental handpieces the juncture between the head and handle includes a slightly flexible coupling which may be damaged if excessive bending force is applied thereto while mounting or demounting a bit in the chuck. Also, the operating mechanism within the head of such a dental handpiece may be damaged if force is applied directly against the ends of the head through which the chuck bore opens.

A general object of this invention is to provide a novel device for mounting and demounting a bit in a chuck of a portable tool, such as a dental handpiece, which device is simply and inexpensively constructed, and is easy and safe to use.

Another object is to provide such a device which is adapted to receive such a tool therein and which includes a shifting member for moving such tool within the device to mount and demount a bit. The shifting member is constructed to engage the tool in regions other than the ends of the head through which the bore of the chuck opens, thus preventing damage to operating mechanism within the head.

Yet another object is to provide such a novel device which provides a channel for slidably receiving and guiding such a tool while it is moved by a shifting member in the device, along the channel toward an abutment at one end of the channel. This serves to bring a bit interposed between the tool and the abutment into engagement with the abutment, and, on further movement of the tool, to force the bit into its proper operating position in the chuck. With the tool being guided by the channel, its movement may be maintained parallel to the line along which the bit is to be forced into the chuck to facilitate proper insertion of the bit.

Still another object is to provide in such a device an elongated pin projecting into and paralleling the axis of the channel at the end of the channel opposite the abutment. The pin is positioned to be aligned axially with the bit-receiving bore in a tool's chuck with the tool in the channel. The tool may be moved by the shifting member toward the pin end of the channel with the pin entering the chuck bore to force the bit out of the chuck. Once again, the channel guides the tool in a proper path, whereby the pin enters the bore aligned with the axis of the bore and facilitates proper demounting of the bit.

These and other objects and advantages will become more fully apparent when the following description is read in conjunction with the drawings, wherein.

Figure 1:
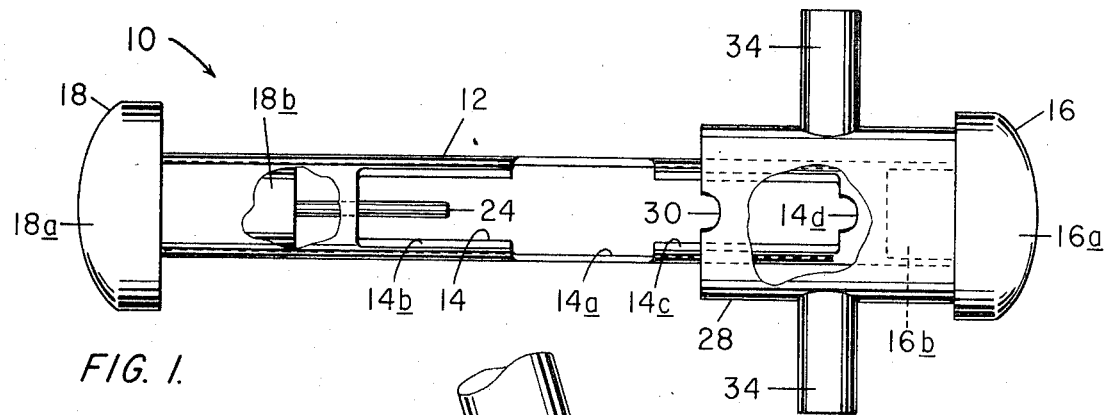
FIG. 1 is a top plan view of a device constructed according to the invention, with a portion broken away.
Figure 2:
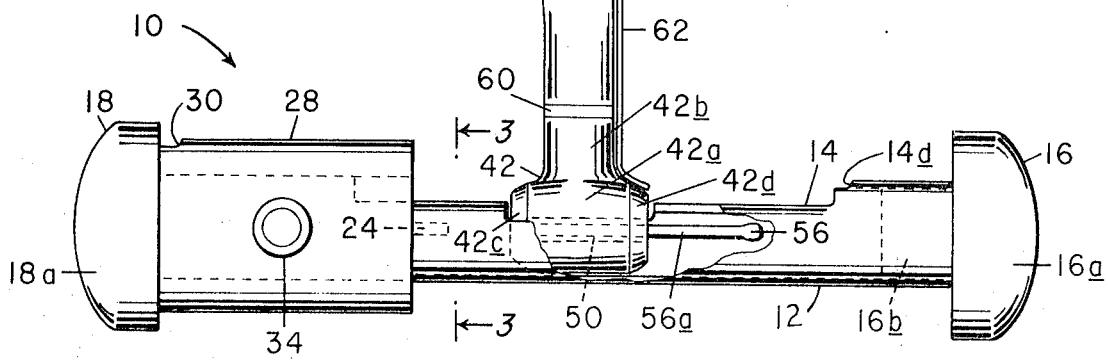
FIG. 2 is a side elevation view of the device, parts therein being shifted to different positions than those shown in FIG. 1 and a portion of the device being broken away, with a dental handpiece received in the device.

Referring now to the drawings, and first more specifically to FIGS. 1 and 2, indicated generally at 10 is a device constructed according to the invention, designed for manual operation to mount and demount a bit in the bit-receiving chuck of a portable tool. The device comprises an elongated, hollow, cylindrical tube 12. An elongated opening 14 extends along one side of tube 12. As is best seen in FIG. 1, section 14a of the opening, situated substantially midway between the ends of the tube, spans substantially the full width of the tube. Sections 14b, 14c of the opening, extending toward opposite ends of the tube from section 14a, are narrower than section 14a. A notch 14d is formed in the right end of opening 14 as seen in FIGS. 1 and 2.

The right end of tube 12, as seen in FIGS. 1 and 2, is closed off by a plug 16. The plug has an enlarged head portion 16a and an abutment portion 16b which fits closely within and is secured in the right end of tube 12.

The opposite end of tube 12, the left end as seen in FIGS. 1 and 2, is closed off by a plug 18 having an enlarged head portion 18a outside the tube and a portion 18b secured within the left end of the tube. Portions 16a, 18a of the plugs define bearing surfaces for fitting against the palm of an operator's hand as will be explained more fully below.

Figure 3:
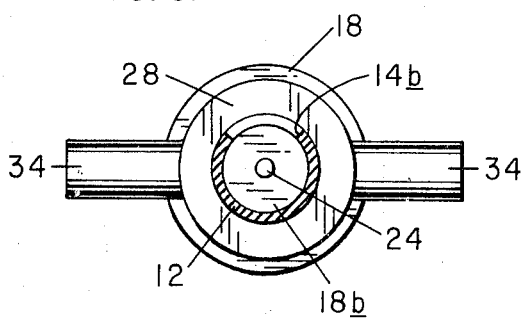
FIG. 3 is a cross-sectional view taken generally along the line 3—3 in FIG. 2.

An elongated pin 24, also referred to herein as an abutment means, is secured adjacent its left end in FIG. 1 to portion 18b of plug 18. The pin projects to the right from plug 18, as seen in FIGS. 1 and 2, and along the longitudinal axis of tube 12, as is seen in FIG. 3.

A cylindrical collar, 28, also referred to herein as shifting means, is mounted on tube 12 for sliding movement longitudinally therealong. The collar is shiftable along tube 12 between the position shown at the right end of the tube in FIG. 1 and the position shown at the left end of the tube in FIG. 2. The enlarged head portions 16a, 18a of the plugs at opposite end of the tube provide stop means which project laterally outwardly from the tube to prevent axial separation of the collar from the tube. As is seen in FIG. 1, the collar has a notch 30 at its left end similar to notch 14d previously described in tube 12. The purpose for each of these notches will be explained more fully below.

A pair of pins 34 are secured to opposite sides of collar 28 and extend radially outwardly therefrom. The pins provide means by which the collar may be grasped and moved along tube 12.

Referring to FIG. 2, at 40 is indicated generally a conventional dental drill, also referred to as a handpiece or tool, having a head 42 and a handle 44. The head includes a substantially cylindrical hollow head portion 42a and a connecting portion 42b. Connecting portion 42b projects from one side of head portion 42a at a substantial angle to the center line of the head portion. Opposite ends of head portion 42a are closed off by caps 42c, 42d, respectively.

A bit-receiving friction chuck 50 (seen in dotted outline) is rotatably mounted within head portion 42a and has an elongated central bore extending therethrough along the central axis of the head portion. The bore of chuck 50 opens at is opposite ends through caps 42c, 42d at opposite ends of head portion 42a. Chuck 50 is operatively connected to a rotating mechanism within head portion 42a whereby it may be rotated under power about its central axis.

The friction chuck is so constructed that a bit, such as that illustrated generally at 56, having an elongated shank portion 56a, may be inserted therein. The bit is mounted in chuck 50 by being forced, shank first, into the bore of the chuck. The chuck fits tightly about the shank and powered rotation of the chuck drives the bit.

Connecting portion 42b of head 42 is connected to handle 44 through a slightly flexible rubber coupling indicated generally at 60. Coupling 60 provides a slight degree of flexibility between the head and handle. Care must be taken that excessive bending forces are not developed in this coupling when a bit is being mounted or demounted in the chuck, as such will damage the coupling. Care must be taken also that excessive pressures are not applied to either of caps 42c, 42d, as this may produce misalignment of operating parts within the head portion.

A small diameter spray tube 62 extends along and is secured to the right side of handle 44 and head 42 as seen in FIG. 2.

Explaining now the operation of the device, to mount a bit in the chuck of such a dental handpiece, the shank of the bit is inserted partially in chuck 50 by hand. The head portion of the handpiece is inserted into tube 12 as shown in FIG. 2 with the bore of the chuck and the bit paralleling the axis of the tube. Opening 14a is of sufficient width to provide clearance for insertion of the head portion. The internal diameter of tube 12 is only slightly larger than the outer diameter of head portion 42a and thus acts as a channel within which head portion 42a may slide longitudinally of the tube and thus be guided along the axis of the tube. Portions 14b, 14c of opening 14 being narrower than portion 14a provide greater guiding control over the head portion of the handpiece as it is moved in either direction from opening portion 14a along the tube.

With the head portion of the handpiece received in tube 12, as shown in FIG. 2, bit 56 projects along the axis of the channel and is interposed between the handpiece and portion 16b of plug 16. With collar 28 positioned at the left end of the tube as illustrated in FIG. 2 the device is cradled in the hand of an operator with head portion 16a of plug 16 bearing against the operator's palm. The operator's fingers grasp pins 34 and slide the collar to the right in the figure, whereby it engages connecting portion 42b of the handpiece and will shift it along the channel provided by the tube until bit 56 abuts portion 16b of the plug. Further movement of the collar and handpiece to the right in FIG. 2 acts to force shank portion 56a further into chuck 50 until it is properly seated in the chuck. Notch 14d in tube 12 provides clearance for spray tube 62 on the hand drill, whereby it will not be crushed as the drill is shifted to the right to force the bit into the chuck.

To demount a bit from the chuck, collar 28 is shifted to the right end of the tube as seen in FIG. 1 and the handpiece is inserted in tube 12 as illustrated in FIG. 2. The device is cradled in the operator's hand with head portion 18a bearing against the operator's palm and the collar is shifted to the left in the figures. As the collar is shifted to the left, its left edge engages connecting portion 42b of head 42, with notch 30 in the collar providing clearance for spray tube 62. Continued movement of the collar to the left moves the handpiece along the channel until pin 24 enters the left end of the bore in chuck 50. Further movement to the left as seen in FIGS. 1 and 2 causes pin 24 to force the bit out of chuck 50.

Figure 4:
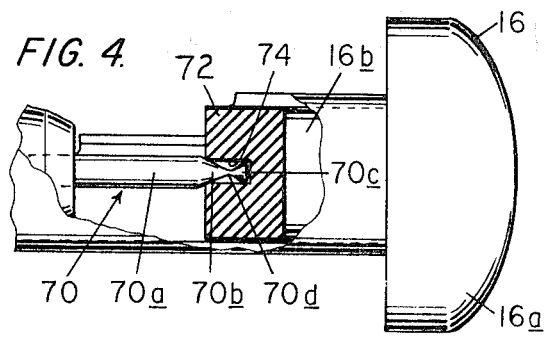
FIG. 4 is a side elevation view, somewhat enlarged, of one end of a modified version of the device with a portion broken away.

Referring now to FIG. 4, a bit 70, commonly referred to as a tulip bit, is illustrated in position to be mounted in the chuck of a handpiece. This bit has a shank 70a which diminishes in cross section in a region 70b on progressing to the right in FIG. 4 toward its cutting portion 70c. Cutting portion 70c has a smaller diameter than shank 70a. A region 70d having a reduced cross section thus is produced adjacent portion 70c. Were the right end of portion 70c to be forced against abutment 16b, as previously explained, the bit might break at region 70d.

A removable adapter 72 is provided which may be inserted in tube 12 and braced against abutment 16b. The adapter is cylindrical, whereby it fits closely within tube 12, and has a bore 74 extending partially therethrough which is aligned with the central axis of the tube. Bore 74 has a diameter slightly greater than the diameter of cutting portion 70c of the bit, but smaller than shank portion 70a.

In operation, a tulip bit partially inserted in the chuck is moved toward plug 16, and cutting portion 70c of the bit enters bore 74. Bore 74 has such depth that portion 70b of the shank engages the side margins of bore 74 before cutting portion 70c contacts an abutting surface. Thus, no load is placed on necked-down portion 70d of the bit, and there is little danger of breaking the bit.

From the above it will be seen that a simple, hand-operated device is provided for mounting and demounting a bit in the friction chuck of a portable tool. The entire shifting force for moving the tool either to the left or to the right in FIGS. 1 and 2 is applied to connecting portion 42d. Thus, excessive bending loads are not applied to coupling 60, nor is excessive pressure applied to either of caps 42c, 42d.

While an embodiment of the invention has been described herein, it should be obvious to those skilled in the art that variations and modifications are possible without departing from the spirit of the invention.

I claim:

1. A device for mounting and demounting a bit in a friction chuck of a portable tool where such chuck includes a bit-receiving elongated bore opening to opposite sides thereof, said device comprising:

means defining an elongated channel adapted freely and slidably to receive and guide such a tool for movement in the channel along a path substantially paralleling the longitudinal axis of said bore, shifting means adjacent said channel for movement along another path substantially paralleling said first-mentioned path engageable with a tool received in said channel and actuatable to shift the tool selectively toward opposite ends of the channel, and a pair of bit abutment means secured adjacent opposite ends of said channel, one of said abutment means being constructed to engage a bit interposed between said one abutment means and a tool in the channel, and when so engaged, and with shifting of the tool toward the end of the channel where said one abutment means is located, to resist movement of the bit toward such end thereby to effect mounting the bit in the bore of the tool's chuck, and the other abutment means being constructed to engage a bit mounted in the bore of a chuck, and when so engaged, and with shifting of the tool toward the end of the channel where said other abutment means is located, to resist movement of the bit toward such end thereby to effect demounting of the bit.

2. The device of claim 1, wherein said other abutment means comprises an elongated pin extending substantially parallel to the longitudinal axis of said channel, positioned to be aligned axially with the bit-receiving bore in a tool's chuck with the tool received in the channel.

3. The device of claim 1, wherein said means defining said channel comprises an elongated tube, and said shifting means comprises a collar slidably mounted on said tube.

4. The device of claim 3, which further comprises stop means adjacent each end of said tube projecting laterally outwardly from the tube to inhibit axial separation of said collar from said tube.

5. The device of claim 3 which is for manual operation, and wherein said shifting means further comprises a pin joined to and projecting outwardly from said collar accommodating digital manipulation of said collar, and mounted adjacent opposite ends of said tube there are means defining bearing surfaces for fitting against the palm of an operator's hand.

6. The device of claim 1, wherein the tool is a dental handpiece including a head portion in which the chuck is mounted and a portion projecting outwardly from the head portion at a substantial angle to the axis of the bore in the chuck, and said shifting means comprises a collar mounted for sliding movement along said means defining the channel and positioned to engage such projecting portion to shift the tool along the channel.

* * * * *